(12) United States Patent
Sauer

(10) Patent No.: US 9,156,647 B2
(45) Date of Patent: Oct. 13, 2015

(54) METHOD AND SYSTEM FOR PROCESSING BUNDLES OF SECURITIES, IN PARTICULAR BANKNOTE BUNDLES

(75) Inventor: Hartmut Karl Sauer, Himmelstradt (DE)

(73) Assignee: KBA-NOTASYS SA, Lausanne (CH)

( * ) Notice: Subject to any disclaimer, the term of this patent is extended or adjusted under 35 U.S.C. 154(b) by 458 days.

(21) Appl. No.: 12/988,748

(22) PCT Filed: Apr. 16, 2009

(86) PCT No.: PCT/IB2009/051583
§ 371 (c)(1),
(2), (4) Date: Oct. 20, 2010

(87) PCT Pub. No.: WO2009/130638
PCT Pub. Date: Oct. 29, 2009

(65) Prior Publication Data
US 2011/0038701 A1 Feb. 17, 2011

(30) Foreign Application Priority Data

Apr. 25, 2008 (EP) .................................... 08155236

(51) Int. Cl.
*B65H 39/10* (2006.01)
*B65G 47/51* (2006.01)
*B65H 3/24* (2006.01)
(Continued)

(52) U.S. Cl.
CPC .............. *B65H 39/10* (2013.01); *B65G 47/514* (2013.01); *B65H 3/242* (2013.01); *B65H 31/3081* (2013.01); *B65H 33/16* (2013.01); *B65H 83/02* (2013.01); *B65H 2301/422* (2013.01); *B65H 2301/42112* (2013.01);
(Continued)

(58) Field of Classification Search
USPC ........ 198/728, 729; 221/281, 274; 270/52.09, 270/52.17; 271/3.05, 34, 35, 198, 3.06; 414/788.4, 788.6, 788.7, 788.8, 789.9, 414/792, 792.2, 792.3, 792.4, 795.8, 795.9, 414/796, 796.1, 797.2, 797.4, 797.6, 797.9; 83/23, 408
See application file for complete search history.

(56) References Cited

U.S. PATENT DOCUMENTS 3,939,621 A 2/1976 Giori
3,982,453 A 9/1976 D'Amato et al.
(Continued)

FOREIGN PATENT DOCUMENTS

DE 33 33 884 4/1985
DE 255516 A * 4/1988
(Continued)

*Primary Examiner* — Gregory Adams
(74) *Attorney, Agent, or Firm* — Seager, Tufte & Wickhem LLP

(57) ABSTRACT

There is described a method for processing bundles (5) of securities, in particular banknote bundles, during production thereof, the method comprising the steps of (a) processing stacks of sheets (SS), each carrying an array of multiple security prints arranged in a matrix of rows and columns, into successive sets (2) of consecutive bundles (5) of securities arranged side-by-side, (b) forming at least one intermediate pile (8; 8*) of consecutive bundles (5) by placing the consecutive bundles (5) of a set (2) one on top of the other, and (c) successively ejecting bundles (5) one-by-one from a bottom of the said at least one intermediate pile (8; 8*) and conveying each ejected bundle (5) with a determined spacing from a preceding and/or following ejected bundle (5). There is also described a bundle processing system to carry out the above method.

10 Claims, 12 Drawing Sheets

(51) Int. Cl.
  *B65H 31/30* (2006.01)
  *B65H 33/16* (2006.01)
  *B65H 83/02* (2006.01)

(52) U.S. Cl.
  CPC ........... *B65H 2301/42322* (2013.01); *B65H 2301/4314* (2013.01); *B65H 2404/232* (2013.01); *B65H 2701/1912* (2013.01)

(56) References Cited

U.S. PATENT DOCUMENTS

| | | | |
|---|---|---|---|
| 4,045,944 A | | 9/1977 | Giori |
| 4,283,902 A | | 8/1981 | Giori |
| 4,354,787 A | * | 10/1982 | Gensike et al. ............ 414/791.2 |
| 4,453,707 A | | 6/1984 | Kuhfuss |
| 4,463,677 A | | 8/1984 | Kuehfuss |
| 4,558,557 A | | 12/1985 | Kuehfuss |
| 4,558,615 A | | 12/1985 | Kuehfuss |
| 4,613,033 A | | 9/1986 | Focke et al. |
| 4,653,399 A | | 3/1987 | Kuehfuss |
| 4,718,808 A | * | 1/1988 | Hoshino et al. ............ 414/788.8 |
| 5,320,479 A | * | 6/1994 | Stearns ...................... 414/794.6 |
| 5,476,361 A | | 12/1995 | Uno |
| 5,507,615 A | | 4/1996 | Uno |
| 5,575,463 A | * | 11/1996 | Parkander .................. 270/52.02 |
| 5,626,005 A | | 5/1997 | Klingelhoefer |
| 6,626,633 B2 | * | 9/2003 | Jendzurski et al. ........ 414/797.9 |
| 6,768,104 B1 | | 7/2004 | Sauer et al. |
| 7,055,816 B2 | * | 6/2006 | Leu .............................. 271/3.01 |
| 7,216,583 B2 | | 5/2007 | Schaede |
| 7,506,492 B2 | | 3/2009 | Sauer et al. |
| 7,603,948 B2 | | 10/2009 | Samanta |
| 7,770,359 B2 | | 8/2010 | Sauer et al. |
| 2003/0131702 A1 | | 7/2003 | Sauer et al. |
| 2006/0162585 A1 | | 7/2006 | Schaede |
| 2006/0225586 A1 | | 10/2006 | Samanta |
| 2007/0163209 A1 | | 7/2007 | Sauer et al. |
| 2009/0211199 A1 | | 8/2009 | Sauer et al. |
| 2009/0224029 A1 | | 9/2009 | Schaede et al. |
| 2009/0243181 A1 | | 10/2009 | Sauer |
| 2010/0189311 A1 | | 7/2010 | Sacher et al. |

FOREIGN PATENT DOCUMENTS

| | | |
|---|---|---|
| DE | 195 15 705 | 10/1996 |
| EP | 0 598 679 | 5/1994 |
| EP | 0 656 309 | 6/1995 |
| EP | 1 607 355 | 12/2005 |
| EP | 1 878 679 | 1/2008 |
| GB | 2 262 729 | 6/1993 |
| JP | 6-190790 | 7/1994 |
| WO | 01/14111 | 3/2001 |
| WO | 01/49464 | 7/2001 |
| WO | 2004/016433 | 2/2004 |
| WO | 2005/018945 | 3/2005 |
| WO | 2005/085070 | 9/2005 |
| WO | 2006/131839 | 12/2006 |
| WO | 2008/010125 | 1/2008 |
| WO | 2008/029340 | 3/2008 |

\* cited by examiner

METHOD AND SYSTEM FOR PROCESSING BUNDLES OF SECURITIES, IN PARTICULAR BANKNOTE BUNDLES

TECHNICAL FIELD

The present invention generally relates to the production of securities, in particular banknotes, and more particularly to a method for carrying out processing of bundles of securities, in particular of banknote bundles, and to a system for carrying out said method.

In the context of the present invention, the term "securities" is to be understood as encompassing all kinds of security and/or valuable documents, such as banknotes, cheques, duty stamps, lottery tickets, passports, identification or travel documents, and the like. Preferably, the securities are banknotes.

PRIOR ART AND BACKGROUND OF THE INVENTION

Methods and apparatuses for processing sheets of securities, especially banknotes, into bundles of securities and stacks of bundles of securities (so-called "finishing" methods and apparatuses) are already known in the art.

Such finishing methods and apparatuses are for instance disclosed in U.S. Pat. No. 3,939,621, U.S. Pat. No. 4,045,944, U.S. Pat. No. 4,283,902, U.S. Pat. No. 4,453,707, U.S. Pat. No. 4,463,677, U.S. Pat. No. 4,558,557, U.S. Pat. No. 4,558,615, U.S. Pat. No. 4,653,399, European patent application No. EP 0 656 309, International application No. WO 01/49464, European patent application No. EP 1 607 355, and International application No. WO 2008/010125, all in the name of the present Applicant. A particularly advantageous solution is disclosed in International application No. WO 2004/016433 also in the name of the present Applicant, which solution is incorporated herein by reference in its entirety and is particularly suitable for the production of an uninterrupted flow of securities with a consecutive numbering sequence. Other known solutions are disclosed in European patent application No. EP 0 598 679, International application No. WO 2005/018945, International application No. WO 2006/131839 and British patent application No. GB 2 262 729.

As explained in the above-identified publications, it is common practice in the art to produce securities in the form of sheets or successive portions of a continuous web each carrying a plurality of security prints arranged in a matrix of rows and columns, which sheets or successive portions of web are ultimately cut to form individual securities, usually after numbering of each security prints.

The term "sheet" will be understood in the following as referring equally to an individual sheet as used in sheet-fed printing presses or to a portion of a continuous web as used in web-fed printing presses, which portion of continuous web is ultimately cut into a sheet after the last web printing operation. At the start of the finishing process, a predetermined number of consecutive sheets (typically hundred sheets) are commonly stacked one above the other to form consecutive stacks of sheets, which sheet stacks are then processed one after the other so as to be cut row-wise and column-wise between the security prints to produce individual bundles of securities. These bundles are then usually stacked to form bundle stacks, typically of ten bundles each.

FIG. 1 schematically illustrates a top view of a sheet stack processing system, generally designated by reference numeral 1, for processing stacks of sheets into individual bundles, which system operates in a manner similar to what is disclosed in U.S. Pat. No. 4,283,902 (see also U.S. Pat. Nos. 4,453,707, 4,463,677, 4,558,557, 4,558,615, and 4,653,399). This processing system is adapted to process sheets at a typical rate of 10,000 sheets per hour. Reference SS designates in this example a given stack of sheets, typically comprising hundred consecutive sheets stacked one upon the other. As already mentioned, it shall be understood that each sheet carries an array or matrix of security prints printed thereon, which array will be defined as consisting of M columns and N rows. The actual number of columns and rows of security prints on the sheets obviously depends on the sheet dimensions and on the dimensions of each security print.

Within the scope of the present invention, and for the sake of clarity, the term "column" should be understood as referring to the arrangement of security prints one next to the other along a first dimension of the sheets, hereinafter referred to as the "sheet length", while the term "row" should be understood as referring to the arrangement of security prints one next to the other along the other dimension of the sheets, hereinafter referred to as the "sheet width", as schematically illustrated in FIG. 2. Strictly speaking, the terms "column"/"row" and "sheet width"/"sheet length" are however interchangeable. According to the above definition, the sheet length typically corresponds to the dimension of the sheets (or web portions) parallel to a transport direction of the sheets (or of the continuous web) through the printing press or presses that were used to carry out the printing operations, while the sheet width corresponds to the dimension of the sheets transversely to the transport direction of the sheets (or of the continuous web). The sheet width is typically greater than the sheet length.

As is typical in the art, the dimensions (whether of individual sheets processed on sheet-fed printing presses or of successive web portions of a continuous web processed on web-fed printing presses) may for instance be as much as 820 mm in width per 700 mm in length (i.e. 820×700 mm). With such sheet dimensions, six (M=6) columns per ten (N=10) rows of security prints with dimensions of e.g. 130×65 mm might for instance be provided on the sheets. With sheet dimensions of 740×680 mm, four (M=4) columns per seven (N=7) rows of security prints with dimensions of e.g. 180×90 mm might for instance be provided on the sheets. For small sheet dimensions, e.g. of 420×400 mm, four (M=4) columns per six (N=6) rows of security prints with dimensions of e.g. 100×60 mm might for instance be provided on the sheets. The above examples are of course given for the purpose of illustration only.

In the schematic illustration of FIG. 1, each sheet carries five (M=5) columns per ten (N=10) rows of security prints, i.e. fifty security prints per sheet. The sheet stack SS is first fed stepwise (along direction y in FIG. 1) through a first cutting station CS1 where the stack SS is cut along the rows of security prints so as to output successive sets of bundle strips S of securities. In this example, ten (N=10) such bundle strips S of securities are produced as a result of the row-wise cutting of each stack SS, each bundle strip S of securities encompassing a given number of security prints, namely five hundred (i.e. M=5 times hundred) security prints in this case (i.e. the equivalent of five bundles of hundred securities each). In the process, margins (not illustrated) at the front and trailing edges of the sheets are typically cut and discarded as well.

Each bundle strip S of securities is then typically fed in sequence through a banding station BS comprising multiple banding units distributed along the length of each bundle strip S of securities (i.e. along direction x in FIG. 1) to provide a securing band around a corresponding one of the plural positions on the bundle strip S which carry security prints. Suitable banding units for carrying out banding (also referred to as "banderoling") are for instance disclosed in International application No. WO 20051085070 in the name of the present Applicant. In this example, the banding station BS comprises as many banding units as there are columns of security prints on each sheet, namely five (M=5) banding units in this example. The banding operation may be omitted or replaced by any other operation aimed at securing the securities together in the form of a bundle arrangement, such as by stapling.

Each bundle strip S of securities thus provided with securing bands, hereinafter referred to as a banded bundle strip S* of securities, is then fed out of the banding station BS to the subsequent processing station. In the illustrated example, each banded bundle strip S* of securities is fed laterally (along a direction opposite to direction x in FIG. 1) out of the banding station BS and then (along direction y) to a collating position where all banded bundle strips S* of securities of a given and same sheet stack SS are regrouped to form a stack-like formation SS* of N banded bundle strips S* of securities corresponding to the arrangement of the original sheet stack SS. In the stack-like formation SS*, the banded bundle strips S* are typically located close to one another or even abutting against each other.

The thus assembled stack-like formation SS* of banded bundle strips S* of securities is then fed stepwise (along direction x) through a second cutting station CS2 where the stack-like formation SS* is cut along the columns of security prints so as to output successive sets 2 of bundles 5 of securities, all banded bundle strips S* being cut simultaneously and stepwise by the second cutting station CS2. In this example, five (M=5) successive sets 2 of bundles 5 of securities, each provided with a securing band, are produced as a result of the column-wise cutting of each stack-like formation SS*, each successive set 2 consisting of a given number of bundles 5 of securities disposed next to the other, namely ten (N=10) bundles 5 of hundred individual securities each (i.e. the equivalent of one column of security prints of the original sheet stack SS). In the process, margins (not illustrated) at the right and left edges of the sheets (i.e. margins at the top and bottom of stack-like formation SS* in FIG. 1) are typically cut and discarded as well. Alternatively, as disclosed in U.S. Pat. No. 4,283,902, the right and left margins might be cut prior to feeding of the sheet stack SS to the first cutting station CS1 using additional cutting devices.

Each set 2 of bundles 5 of securities then needs to be evacuated before the next set 2 of bundles 5 arrives. Each bundle 5 of the set 2 must further be separated so as to form a flow a spaced-apart bundles 5, as schematically illustrated in FIG. 1. Such separation is necessary so that each bundle can be further processed individually, especially to form suitable stacks 75 of bundles 2 (referred to hereinafter as "bundle stacks"). This additional processing of the individual bundles 5 into bundle stacks 75 in particular includes the rotation by 180 degrees of every two bundle 5 (which alternate rotation of bundles is schematically illustrated in FIG. 1) so as to compensate for the typical thickness variations of the securities due, for instance, to the varying reliefs created as a result of intaglio printing, the presence of security elements applied onto selected regions of the substrate (such as OVD's—Optically Variable Devices) or of security element embedded locally in the substrate (such as watermarks, security threads, windows, etc.). In that respect, the securing band provided around each bundle is also typically applied at banding station BS in an offset manner with respect to the middle portion of each bundle.

Considering a typical processing speed of 10,000 sheets per hour, a new stack SS of hundred sheets will be supplied upstream of the first cutting station CS1 every thirty-six seconds (=(100*3,600)/10,000), which amounts to a new set 2 of N bundles 5, downstream of the second cutting station CS2, every 36/M seconds (or a new bundle 5 every 36/(M*N) seconds). In this example where each sheet carries five (M=5) columns and ten (N=10) rows of security prints, this means that a new set 2 of N bundles arrives every 7.2 (=36/5) seconds, i.e. a new bundle 5 every 0.72 (=36/(5*10)) seconds. The amount of time available to evacuate each set 2 of N bundles and carry out the above-mentioned bundle separation operation is thus limited.

Up to now, the bundle separation operation was carried out by separately seizing and accelerating each bundle of a set using adequate seizing and/or pushing members to create a sufficiently large spacing therebetween. This solution is however not satisfactory because it requires a relatively complex and large system for carrying out the separation of the bundles. There exists furthermore a substantial risk that a bundle is not properly seized or pushed by the seizing/pusher members, leading to jamming problems and, even worse, to irreversible damage to the bundles.

There is therefore a need for an improved solution which is of simpler and more robust configuration, while guaranteeing as much as possible a smooth processing of the bundles and reduce the likelihood of jamming and/or damages to bundles.

Furthermore, considering that the above-discussed processing of sheets stacks into individual bundles constitutes the final stage in the production process, close attention must be paid to both optical and physical quality requirements. Accordingly, it may be necessary to carry out a statistical process control during production, i.e. to remove one or more sample bundles out of the flow of bundles outputted downstream of the last cutting station in order to check the securities contained therein for errors or physical damage, especially in order to control that the securities have been cut properly and that the so-called print-to-cut register (i.e. the position of the imprints with respect to the cut edges) of the securities is correct. One cannot however merely take one or more bundles out of the flow of bundles, since this leads to a break in the sequence of bundles. A corresponding number of replacement bundles must either be inserted at the relevant places in the flow of bundles where sample bundles are taken or the sample bundles must be re-integrated in the flow after examination. Such operations shall be carried out during the finishing process without interfering with the continuous processing of the bundles. The reintroduction of sample bundle(s) in the production flow is particularly critical to carry out when producing an uninterrupted flow of bundles having a consecutive numbering sequence (as taught in International application No. WO 2004/016433 mentioned hereabove) as the sample bundle(s) may only be re-integrated at the correct position(s) in the production flow.

With the known solutions, a statistical process control is very difficult to implement due to the mechanical configuration of the system and to time constraints (there is typically not sufficient time to take one or more sample bundle(s) out of the flow and insert replacement bundle(s) or reintroduce the sample bundle(s) after examination).

There is accordingly a need for an improved process and system for processing bundles of securities.

SUMMARY OF THE INVENTION

An aim of the present invention is thus to provide an improved method and system for processing bundles of securities, in particular banknote bundles, during production thereof, which bundles of securities are supplied, downstream of a sheet stack processing system as discussed above, in the form of successive sets of consecutive bundles arranged side-by-side, i.e. a method and system capable of processing sets of bundles of securities as these emerge batch-wise from the output of the last cutting station of the sheet stack processing system. More particularly, the present invention relates to a method and system that is capable of carrying out prompt evacuation of said sets of bundles, as well as proper separation of the bundles of securities from one another and conveyance thereof.

Another aim of the present invention is to provide such a method and system that is simple to implement and robust, while guaranteeing that high production efficiency can be maintained.

Still another aim of the invention is to provide a solution that makes it possible to carry out a statistical process control of the produced bundles of securities.

Accordingly, the present invention relates to a method for processing bundles of securities, in particular banknote bundles, during the production thereof, the method comprising the steps of:
a) processing stacks of sheets, each carrying an array of multiple security prints arranged in a matrix of rows and columns, into successive sets of consecutive bundles of securities arranged side-by-side;
b) forming at least one intermediate pile of consecutive bundles by placing the consecutive bundles of a set one on top of the other; and
c) successively ejecting bundles one-by-one from a bottom of the said at least one intermediate pile and conveying each ejected bundle with a determined spacing from a preceding and/or following ejected bundle.

The present invention also relates to a bundle processing system for processing bundles of securities according to the above method, the system comprising:
a sheet stack processing system for processing stacks of sheets into successive sets of consecutive bundles of securities arranged side-by-side;
pile forming means for placing consecutive bundles of a set one on top of the other and thereby form at least one intermediate pile of consecutive bundles;
an ejector for ejecting the bundles one-by-one from a bottom of the said at least one intermediate pile; and
a conveyor for conveying each ejected bundle with a determined spacing from a preceding and/or following ejected bundle.

The present invention is particularly advantageous over prior art methods and systems, because it allows for prompt evacuation and separation of the bundles of securities at high speeds and in a simple way, while reducing the likelihood of damages to the bundles of securities and of system jamming.

Advantageous embodiments of the present invention form the subject-matter of the appended dependent claims.

According to a preferred embodiment, the bundles are ejected one-by-one from a bottom of said at least one intermediate pile and thereafter conveyed by means of a conveyor running below the said at least one intermediate pile and comprising a plurality of pusher members acting as the ejector, which pusher members are spaced apart from one another by the determined spacing, each pusher member being adapted to eject and convey one bundle from the bottom of the said at least one intermediate pile.

According to a first variant of this preferred embodiment, the conveyor is arranged so as to be running at a bottom part of an intermediate storage compartment where the consecutive bundles of a set are guided to form the intermediate pile, and the pusher members are adapted to eject and convey one bundle from the bottom of the intermediate pile through a lateral opening provided at the bottom of the intermediate storage compartment.

According to another variant of the preferred embodiment, an intermediate storage area is provided for storing a plurality of intermediate piles of consecutive bundles before ejection and conveyance thereof. In this case, pile conveying means are provided to feed each intermediate pile in succession from the intermediate storage area into an intermediate storage pocket adapted to receive a first one of the plurality of intermediate piles and the conveyor runs at a bottom part of the intermediate storage pocket, with the pusher members acting as ejector being adapted to eject and convey one bundle from the bottom of the intermediate pile contained in the intermediate storage pocket through a lateral opening provided at the bottom of the intermediate storage pocket.

The method may further comprise the step of forming bundle stacks each consisting of a predetermined number of bundles stacked one upon the other (e.g. ten bundles) which have been ejected and conveyed from the bottom of the intermediate pile. Such forming of bundle stacks may advantageously be carried out so as to form bundle stacks with a succession of bundles alternately rotated by 180 degrees, for instance by rotating a growing bundle stack comprising at least one bundle before placing a subsequent bundle on top of the growing bundle stack.

The method and system may further be adapted to permit statistical process control by enabling removal of at least one sample bundle from the flow of ejected bundles, thereby creating at least one corresponding empty slot in the flow of bundles, and replacing the said at least one sample bundle by a replacement bundle so as to fill in said at least one corresponding empty slot in the flow of bundles. Similarly, the method and system may also be adapted to carry out removal of at least one sample bundle, thereby creating at least one corresponding empty slot in the flow of bundles, and later reintroducing the said at least one sample bundle into the said at least one corresponding empty slot.

BRIEF DESCRIPTION OF THE DRAWINGS

The system of the present invention is now illustrated by way of examples with reference to the appended illustrations, in which.

DETAILED DESCRIPTION OF THE PREFERRED EMBODIMENTS

Figure 6:
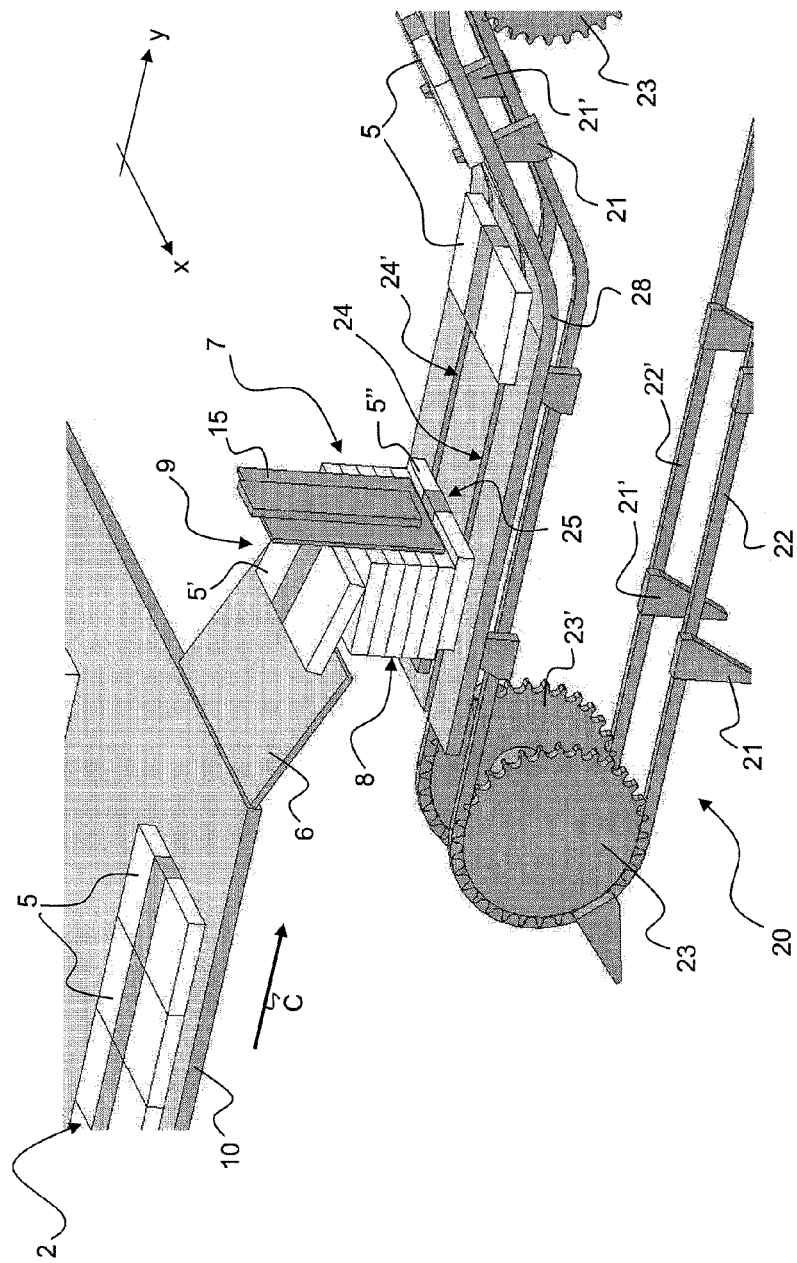
Figure 7:
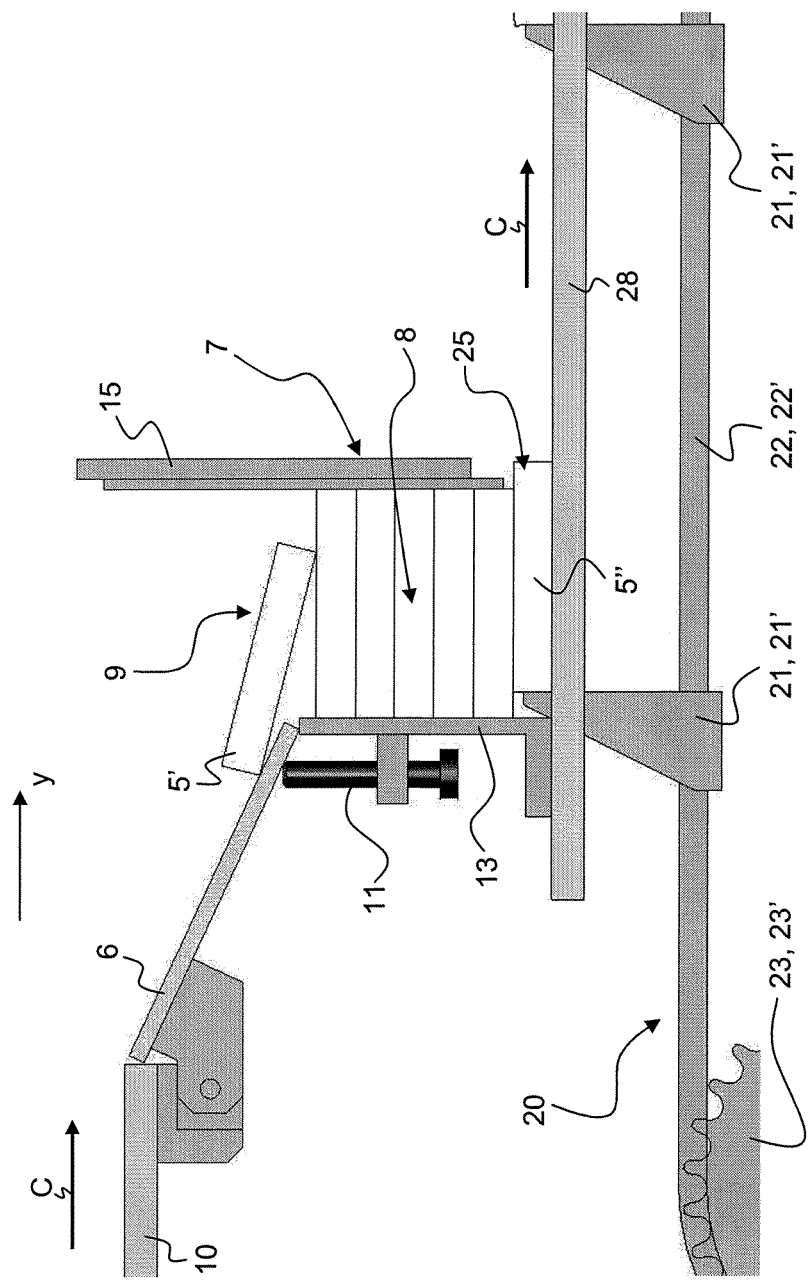
FIG. 7 is a side view of the location of the bundle processing system shown in FIGS. 5 and 6.
Figure 8:
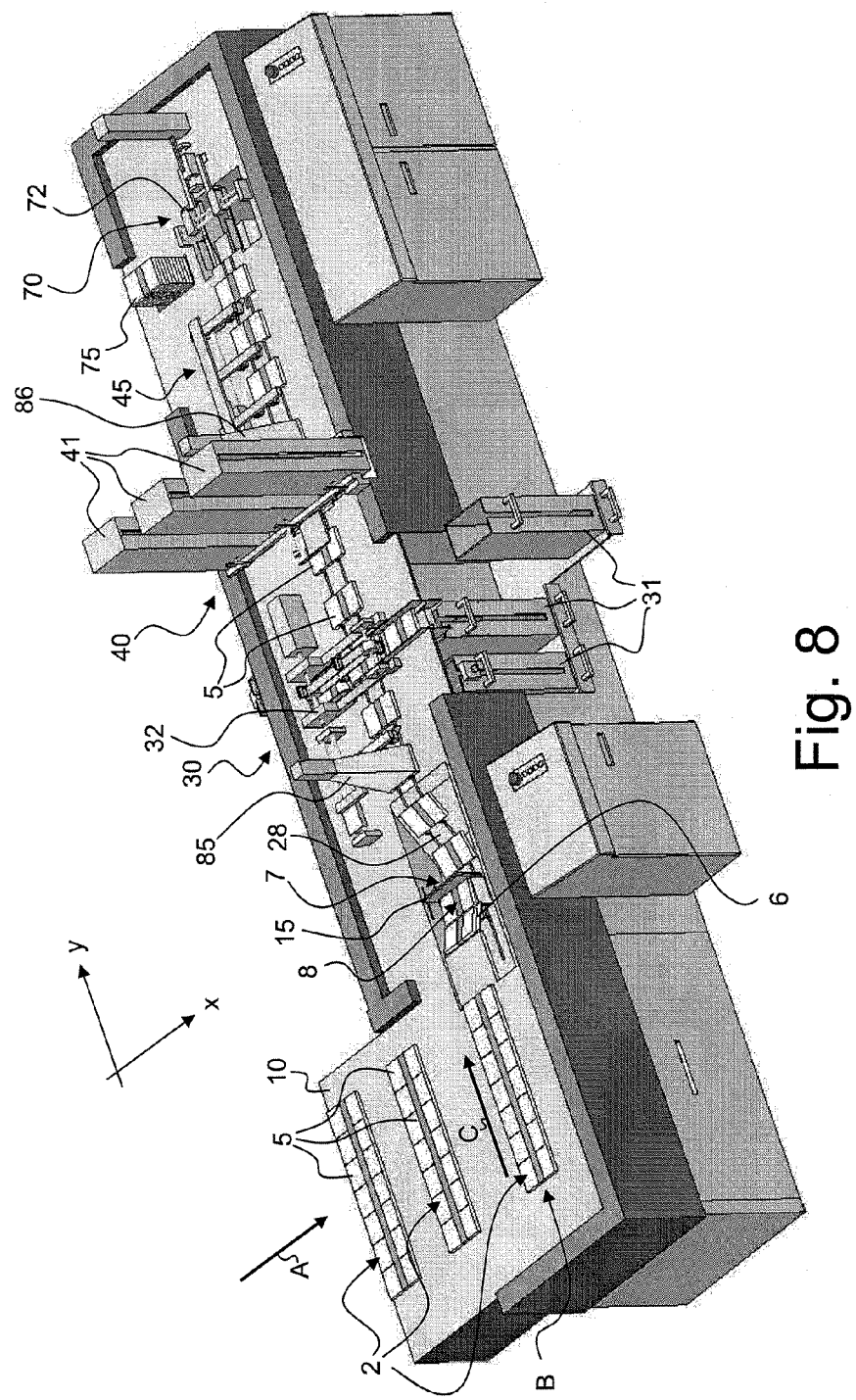
FIGS. 8 and 9 are perspective views from two different angles of a complete bundle processing system according to FIGS. 3 to 7.
Figure 9:
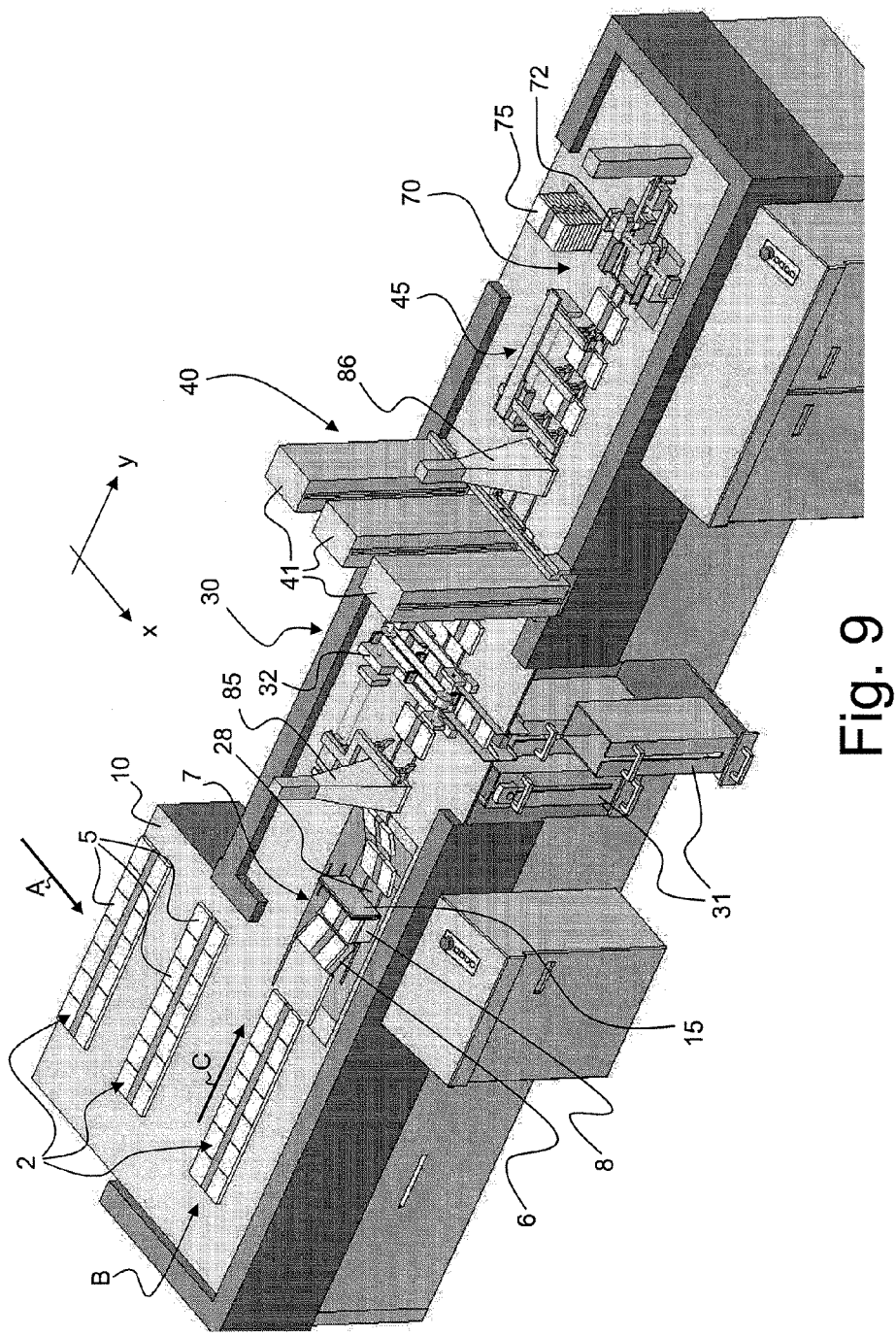

FIGS. 3 to 7 illustrate a first embodiment of the method and system for processing bundles of securities according to the present invention. FIGS. 3 to 7 are only partial schematic views illustrating the main components of the bundle processing system. Some parts not relevant to the invention have been omitted for the sake of the explanation. Exemplary views of a complete bundle processing system according to FIGS. 3 to 7 are shown in FIGS. 8 and 9.

Figure 1:
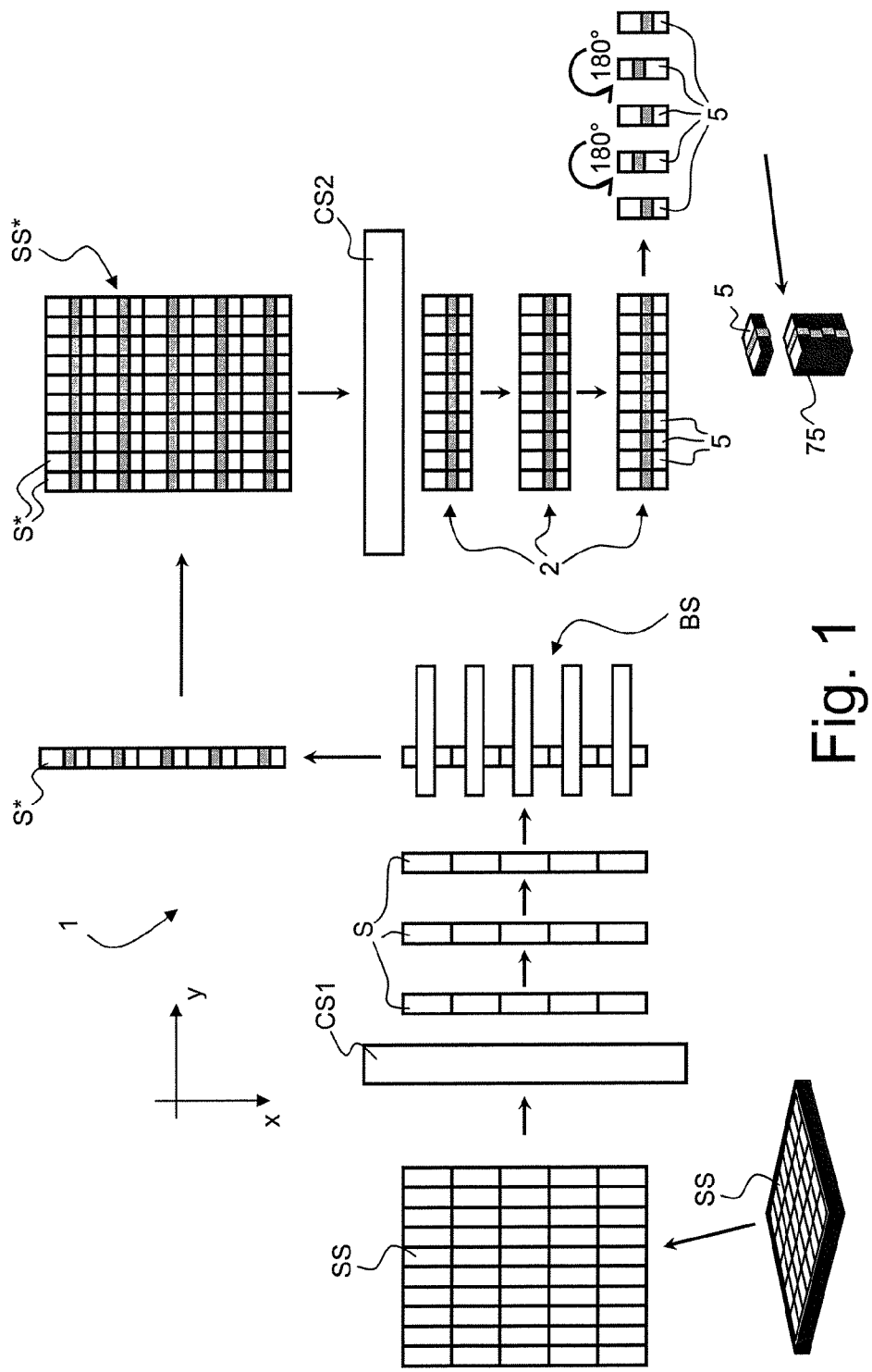
FIG. 1 is a schematic top view of a sheet stack processing system for processing stacks of sheets each carrying an array of multiple security prints arranged in a matrix of rows and columns into successive sets of consecutive bundles of securities arranged side-by-side.
Figure 2:
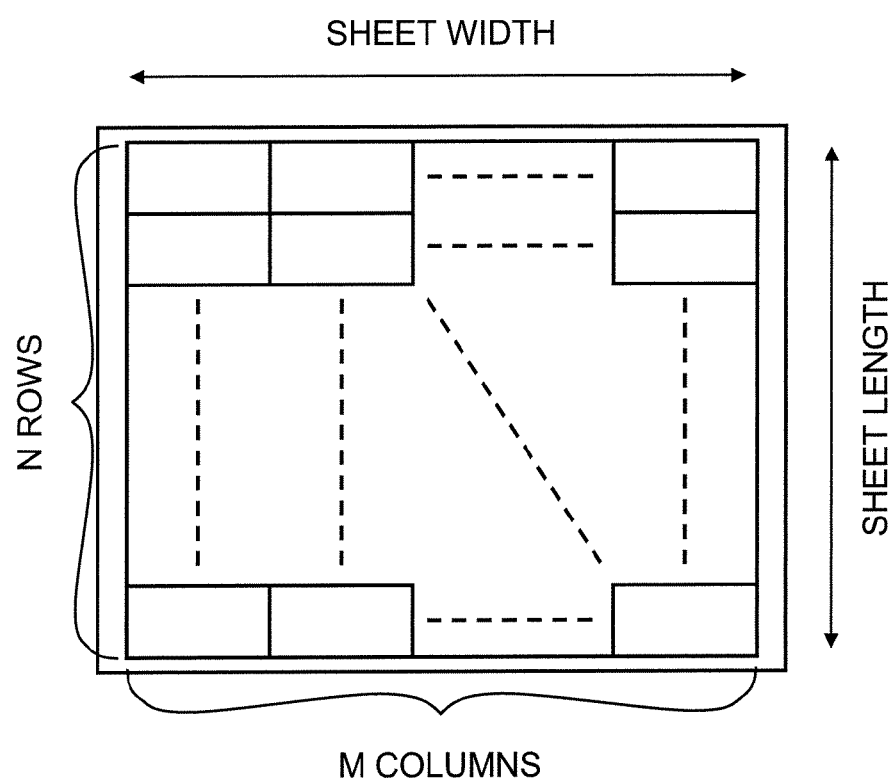
FIG. 2 is a schematic view of a sheet layout illustrating the notions of "columns", "rows", "sheet length" and "sheet width" within the scope of the present invention.
Figure 3:
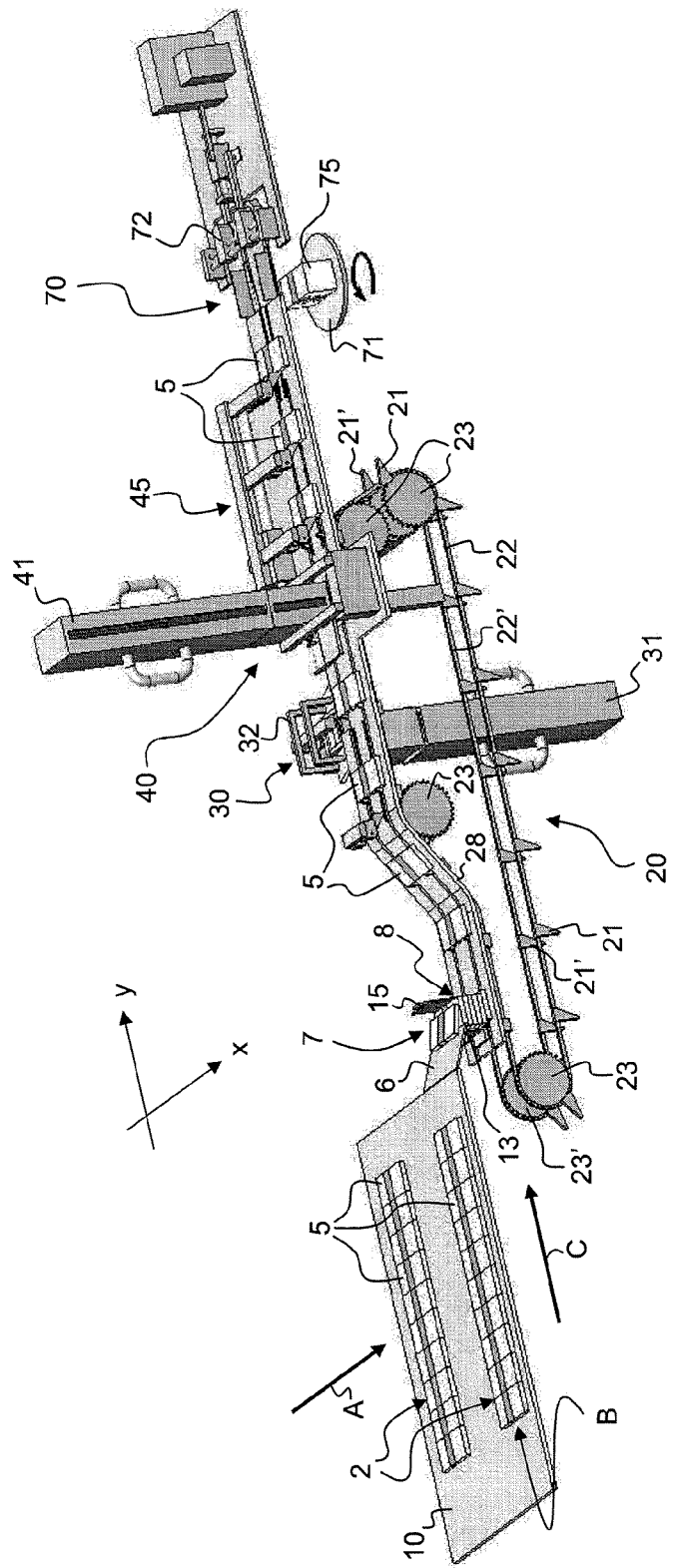
FIG. 3 is a schematic partial perspective view of a bundle processing system according to one embodiment of the invention.
Figure 4:
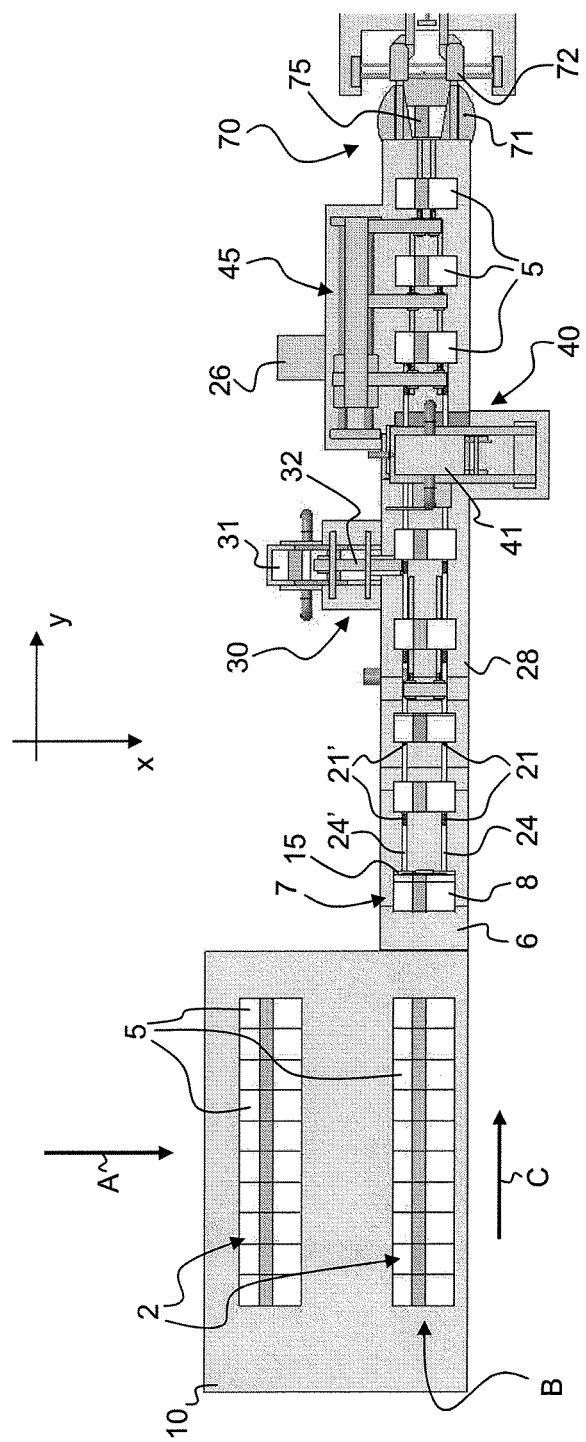
FIG. 4 is a top view of the bundle processing system of FIG. 3.

As can be seen from the Figures, successive sets 2 of consecutive bundles 5 of securities emerge on a platform 10 on the left-hand side of the system. In FIGS. 3 and 4 only two such sets 2 of bundles 5 are illustrated, while FIGS. 8 and 9 shows three sets 2 of bundles 5. These successive sets 2 of bundles 5 are produced in the same way as discussed in the preamble hereof in reference to FIG. 1. In other words, the successive sets 2 of consecutive bundles 5 are produced as a result of the row-wise and column-wise cutting operations of a sheet stack SS as shown in FIG. 1, i.e. each successive set 2 of bundles 5 consists of a determined number of individual bundles 5 (namely ten bundles in the example of FIGS. 3 to 7 and eight bundles in the example of FIGS. 8 and 9), each typically provided with a securing band, obtained as a result of the ultimate cutting operation of a corresponding stack of sheets. It shall therefore be understood that the platform 10 is placed downstream of the last cutting station where the sets 2 of individual bundles 5 are produced (i.e. downstream of cutting station CS2 in FIG. 1) and that each set 2 consists of multiple bundles 5 arranged side-by-side, the number of which is equal to the number N of rows of security prints on each sheet and varies according to the sheet layout. The sets 2 are accordingly fed onto platform 10 along a direction indicated by arrow A in FIGS. 3, 4, 8 and 9, which direction is parallel to axis x of the (x; y) referential indicated in the Figures (the same applies to the second embodiment which will be discussed hereafter in reference to FIGS. 10 to 12).

The securities are advantageously and preferably provided with at least one alphanumerical serial number that is printed on the sheets (or web) according to the numbering principle disclosed in International application No. WO 2004/016433, which is incorporated herein by reference in its entirety. Indeed, thanks to this numbering principle, an uninterrupted flow of securities with a consecutive numbering sequence can be produced and the bundles 5 of securities can simply be stacked one upon the other as they are supplied without breaking the consecutive numbering sequence. In such case, no bundle collating system is required to collect and assemble the bundles with the appropriate numbering sequences, as would be necessary with conventional numbering techniques using, e.g. purely mechanical numbering boxes.

According to this first embodiment, the bundles 5 are guided from the platform 10 into an intermediate storage compartment 7 to form an intermediate pile 8. The bundles exit the intermediate storage compartment 7 one by one at a bottom part thereof and are conveyed on a conveyor 20 which extends along axis y successively in front of a bundle unloading station or device 30 and a bundle loading station or device 40, which will be described in greater detail hereinafter.

Downstream of the conveyor 20 is further provided a bundle stacking station 70, where bundle stacks 75 are prepared. A conveyor arrangement 45 is provided at a downstream end of the conveyor 20, in front of the bundle stacking station 70 to ensure proper transfer of the bundles 5 from the conveyor 20 to the bundle stacking station 70. The individual steps and devices involved in the processing of bundles are described in further detail below.

In a set 2 of bundles 5 as defined herein, the bundles 5 are preferably aligned side-by-side along their longer sides (which longer sides extend along axis x) in the direction indicated by axis y of the (x; y) referential indicated in the Figures. The sets 2 of bundles 5 are fed on platform 10 one after the other along the direction indicated by arrow A until they reach a location indicated by reference B in FIGS. 3, 4, 8 and 9, which location B lies on a same lane extending along axis y as the intermediate storage compartment 7 and conveyor 20 (as well as the conveyor arrangement 45 and bundle stacking station 70). From this location B, the bundles 5 of the set 2 are guided into the intermediate storage compartment 7 along a direction indicated by arrow C in the Figures by means of a known conveyor arrangement that is not illustrated, but can be similar to conveyor arrangement 45. Such conveyor arrangement may for instance include a set of pushers members that are adapted to run back and forth parallel to axis y above the bundles 5 to be pushed into the intermediate storage compartment 7.

Figure 5:
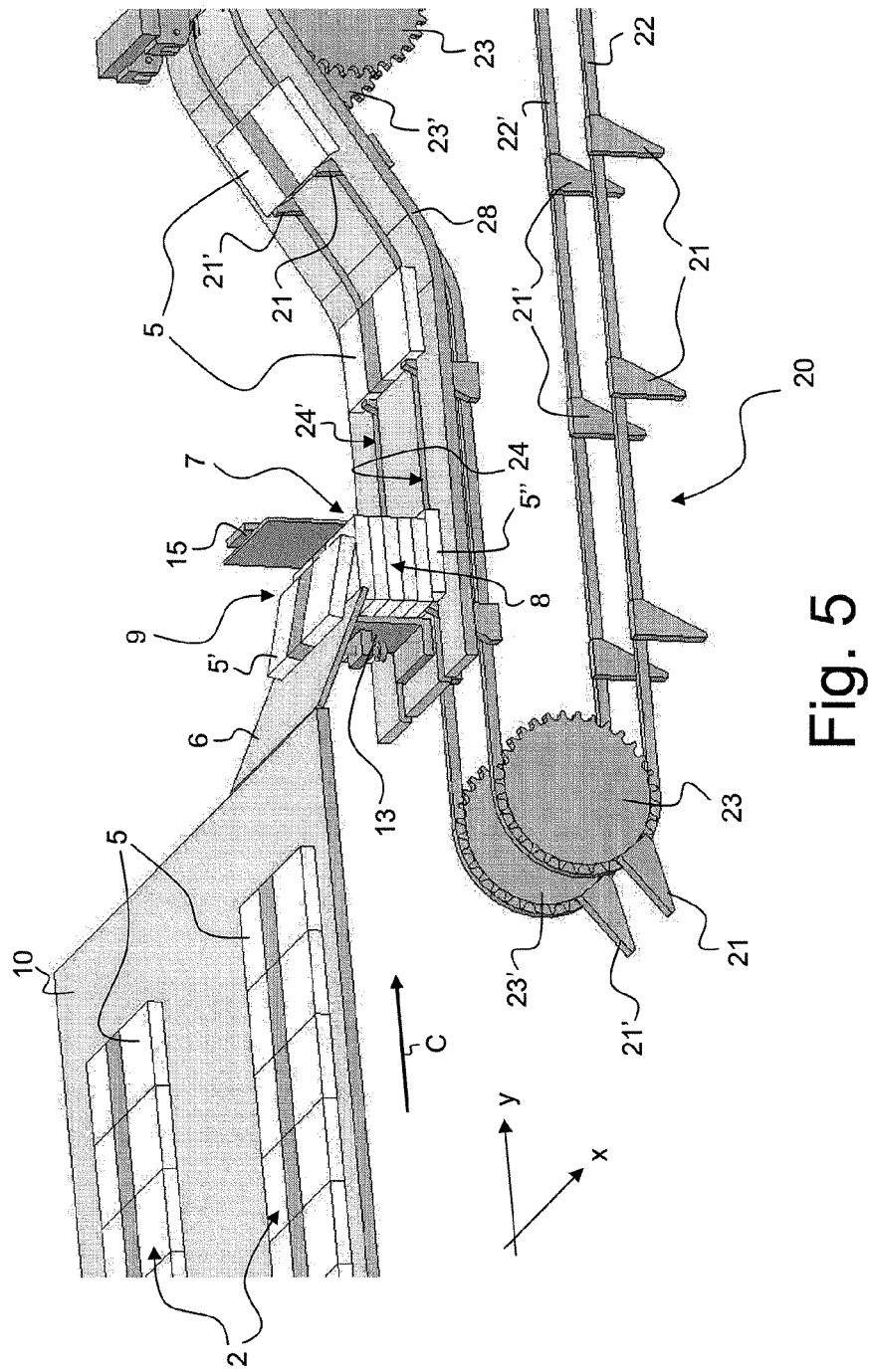
FIGS. 5 and 6 are enlarged partial perspective views from two different angles of the bundle processing system of FIGS. 3 and 4 where consecutive bundles are piled one on top of the other to form an intermediate pile of bundles in an intermediate storage compartment, before being ejected one-by-one and conveyed from a bottom part of the intermediate storage compartment.

Bundles 5 of an entire set 2 are thus guided towards the intermediate storage compartment 7 preferably via an inclined ramp 6 leading down to the intermediate storage compartment 7 which comprises first and second retainer structures 13, 15 placed on either side of the intermediate storage compartment 7 along axis y. Intermediate storage compartment 7 could also comprise lateral side walls (not illustrated) placed on either side of the intermediate storage compartment 7 along axis x. Inclined ramp 6 is advantageous in that it permits to properly guide the bundles 5 into the intermediate storage compartment 7 and prevent that these turn over during the piling process. In the process, individual bundles 5 consecutively reach, i.e. one after the other, the inclined ramp 6 and are caused to slide along the inclined ramp 6 by inertia and gravity to reach the intermediate storage compartment 7 and fall between retainer structures 13, 15 thereof. In the illustrations of FIGS. 5 to 7, a bundle, designated by reference numeral 5', is shown still sliding on the lower end of inclined ramp 6 and being partially placed on top of a resulting intermediate pile 8 of six bundles 5. It will be understood that the first bundles 5 to reach the intermediate storage compartment 7 will be free to fall into the intermediate storage compartment 7. The conveyor 20 is located in this example immediately below the intermediate storage compartment 7 so that the intermediate pile 8 of bundles 5 is formed directly on a supporting ramp 28 of the conveyor 20, which supporting ramp 28 is preferably leading up from the bottom of the intermediate storage compartment 7 to the same plane as the platform 10. Accordingly, an intermediate pile 8 of bundles 5 is formed through guiding of the bundles 5 along the inclined ramp 6 through an upper, bundle-receiving opening 9 situated at the top of intermediate storage compartment 7. The intermediate storage compartment 7 is thus filled from its bottom to its top by consecutive bundles 5 thereby forming intermediate pile 8.

The inclined ramp 6 and intermediate storage compartment 7 are shown in more detail in FIGS. 5 to 7. The timing of the bundles 5, the angle of inclination of inclined ramp 6, the spacing between retainer structures 13, 15, and the height of the intermediate storage compartment 7 are selected such as to ensure proper formation of the intermediate pile 8. It shall be appreciated that these parameters will be adjusted in accordance with the actual dimensions and weight of the bundles 5. In that respect, it would be advantageous to design the inclined ramp 6 such that the angle of inclination thereof and/or the height of the intermediate pile 8 can be adjusted. Similarly, a position of retainer structure 15 along axis y is preferably adjustable. As illustrated schematically in FIG. 7, the inclination of ramp 6 may for instance be adjusted by means of an adjusting bolt 11 which acts on a downstream end of the ramp 6, while ramp 6 is attached to an underside of platform 10 so as to pivot at an upstream end of ramp 6. The material of inclined ramp 6 is also a relevant factor to be taken into account when adjusting the angle of inclination thereof as it affects the speed at which the bundles 5 slide on the ramp 6. Of course, other means for adjusting the angle of inclination of the ramp 6 may be provided, such as a motor-driven adjusting arrangement, or an adjusting mechanism including a hand-turnable wheel or a rod, amongst others.

Preferably, the angle of the plate 6, with respect to a horizontal plane (defined by axes x and y), is in the range of 10-45°, more preferably 20-35°, and most preferably 22-30°. The exact angle to be selected will depend on the parameters indicated above, as well as on the weight of each individual bundle 5.

In the illustrations of FIGS. 3 to 7, the intermediate storage compartment 7 is shown to be configured such that an intermediate pile 8 of six bundles 5 is formed therein, i.e. less than the actual number of bundles 5 (namely ten in the example of FIGS. 3 to 7) composing each set 2 of bundles 5, which implies that all bundles 5 are not guided at once in the intermediate storage compartment 7. In this example, the bundles 5 of a given set 2 are rather preferably guided into the intermediate storage compartment in several phases, for instance by guiding only the first five or six bundles 5 of a set 2 into the intermediate storage compartment 7 and then the remaining four or five bundles of the set one-by-one at a rate corresponding to the rate at which the intermediate storage compartment 7 is emptied by the conveyor 20 at its bottom, which process can be performed before the next set 2 of bundles 5 arrives at location B. The intermediate storage compartment 7 could alternately be configured so that all N bundles 5 of a set 2 may be guided in the intermediate storage compartment 7 so as to form an intermediate pile 8 having N bundles 5. The depth of the intermediate storage compartment 7 shall however be selected with a view to avoid causing damages to the bundles 5 as a result of the fall thereof.

In the embodiments shown in FIGS. 3 to 9, the intermediate storage compartment 7 is located immediately above the conveyor 20, so that the lowest bundle of the intermediate pile 8, designated by reference numeral 5" in FIGS. 5 to 7, comes to lie directly on the supporting ramp 28 of the conveyor 20. Consecutive bundles 5 are placed one above the other on the lowest bundle 5". Bundles 5 exit the intermediate storage compartment 7 one-by-one at the bottom of intermediate pile 8 through a bundle-ejection opening 25 provided between retainer structure 15 and supporting ramp 28, as can be seen in FIGS. 6 and 7. In these Figures, the bundle 5" at the lowest end of the intermediate pile 8 is illustrated as being in the process of being ejected from the bottom of intermediate pile 8 under the action of pusher members 21, 21' of the conveyor 20, which pusher members 21, 21' act as an ejector device.

It follows from the above that the intermediate pile 8 in the intermediate storage compartment 7 of the embodiment of FIGS. 3 to 9 can be continuously filled up with new incoming sets 2 of bundles 5 while these are ejected at the bottom of the intermediate pile 8 under the action of the conveyor 20. The parameters mentioned above (e.g. timing of the conveyor arrangement pushing the bundles 5 from the platform 10 towards the inclined ramp 6, the angle of inclination of the ramp 6, etc.) play a role in assuring the continuity of the process and avoiding damage to bundles 5 while these are piled in the intermediate storage compartment 7.

The term "intermediate storage compartment" used to designate element 7 in the aforementioned Figures is to be understood as a structure suitable to confine the bundles 5 coming from the platform 10 in a piled form as explained. In FIGS. 3 to 9, two elements are shown that retain the bundles 5, namely a rear retainer structure 13, which can take the form of a vertical plate that is fixed to the supporting ramp 28 of the conveyor 20, and a front retainer structure 15, which can also take the form of a vertical plate that is fixed to a machine frame (not illustrated in FIGS. 3 to 7) of the bundle processing system, preferably in an adjustable manner. FIGS. 8 and 9 schematically show the front retainer structure 15 mounted at a side thereof in a vertical frame, the position of the front retainer structure 15 being adjustable in both direction along axis y. Of course, any other suitable retaining structures may be used instead of plates 13, 15, such as supporting rods for example.

As clearly visible in FIGS. 6 and 7, the front retainer structure 15 of the intermediate storage compartment 7 is located so as to leave an opening or gap 25 between its lower end and the surface of the supporting ramp 28 of conveyor 20. This opening 25, which is set to be slightly larger that the height of a bundle 5, is preferably also adjustable to the height of each bundle 5. As already explained, the bundle 5" situated at the lowest position in the intermediate pile 8 can exit from the intermediate storage compartment 7 through the opening 25, as illustrated in FIGS. 6 and 7.

The conveyor 20 comprises a supporting ramp 28 and at least one channel provided in said supporting ramp 28 which extends along the direction of transportation of the bundles 5 wherein pusher members are guided. As illustrated in the Figures, two channels designated by reference numerals 24, 24' are provided, which channels 24, 24' allow passage of corresponding pairs of spaced-apart pusher members 21, 21' guided therein.

The exiting or ejection of the lowest bundle 5" from the bottom of the intermediate pile 8 through the bundle-ejection opening 25 is realised by means of the pairs of pusher members 21, 21'. These pusher members 21, 21' are aligned on and attached to a pair of parallel belts or chains 22, 22' forming endless loops which are guided on and driven by corresponding gearwheels 23, 23', one of which being driven into rotation, e.g. by means of at least one associated drive 26 that is partly visible in FIG. 4 and drives the lower right pair of gearwheels 23, 23' of the conveyor 20 (see also FIGS. 10 and 12 where a similar driving arrangement is illustrated). The drive 26 drives the said pair of gearwheels 23, 23' continuously (or semi-continuously) into rotation, causing displacement of the associated chains 22, 22' and pusher members 21, 21'. The speed of conveyor 20 may advantageously be adjusted by means of the drive 26.

The gearwheels 23, 23' are arranged in such a way that the pusher members 21, 21' are situated and guided along the transporting direction (i.e. in a vertical plane comprising axis y) in the corresponding pair of channels 24, 24' of the supporting ramp 28 which extend along the conveyor 20. Only the upper part of each pusher member 21, 21' extends through the corresponding channel 24, 24' in which it is guided, sufficiently high to engage with a side of the bundles 5 placed on the supporting ramp 28 and transport them in the transporting direction. It may be noted that the height of the pusher member 21, 21' extending over the surface of the supporting ramp 28 can advantageously vary along the path of the conveyor 20. For instance, when a pair of pusher members 21, 21', enters the channels 24, 24' of the supporting ramp 28 to engage with a side of the lowest bundle 5" of the intermediate pile 8, at the bottom of the intermediate storage compartment 7, the height of the pusher members 21, 21' shall be less than the height of the bundle, so that only the lowest bundle 5" of the intermediate pile 8 is ejected. In this way, damage to the remaining bundles 5 lying in the intermediate pile 8 above the lowest bundle 5" which is ejected is avoided and only the lowest bundle 5" is pushed through the ejection gap 25 mentioned above. Once a bundle 5 is ejected from the intermediate pile 8, the height of the pair of pusher members 21, 21' above the supporting ramp 28 may increase, which can be achieved by guiding the belts or chains 22, 22' closer to the supporting ramp 28 downstream of the intermediate storage compartment 7, thus reducing any risk that a bundle 5 gets loose during transportation on the conveyor 20.

The conveyor 20, comprising supporting ramp 28, pusher members 21, 21', chains 22, 22' and gearwheels 23, 23' thus transports the bundles 5 with a determined spacing along the supporting ramp 28. Further functional units may be provided along the path of the bundles 5 as will be described further below.

It may be appreciated from the above, that the intermediate storage compartment 7 fulfils the function of a buffer, since it collects several bundles 5 at a time. On the other hand, the conveyor 20 fulfils both the function of ejector to eject the bundles 5 one-by-one from the bottom of the intermediate pile 8 and the function of separator to separate the thus-ejected bundles 5 from one another by a determined spacing. The spacing separating two bundles 5 on the conveyor 20 is determined by the spacing between successive pairs of pusher members 21, 21' on the chains or belts 22, 22'. The speed of transportation of the bundles 5 and thus the frequency at which bundles are ejected from the bottom end of intermediate storage compartment 7 is determined by the speed of conveyor 20, which may conveniently be adjusted by controlling the speed of the chains 22, 22' through an adjustment of the drive 26 of the gearwheels 23, 23' as mentioned.

A bundle unloading station 30, visible in FIGS. 3, 4, 8 and 9, is provided downstream of the intermediate storage compartment 7 along the path of the bundles 5 which are conveyed by conveyor 20. This bundle unloading station 30 comprises a bundle removal device 32 designed for automatically removing any selected sample bundles 5 from the conveyor 20. As mentioned above, removal of sample bundles is generally operated for checking the quality of the processed securities in an off-line process. Such sampling is in particular intended to enable a so-called statistical process control of the production process. In that respect, one would typically check the processed bundles of securities for any defects that may result from inadequate cutting operations that could have occurred during the prior processing of the sheet stacks into bundles, in particular for so-called print-to-cut register problems, i.e. deviation between the position of the security prints on each security and the edges thereof. A quality control device and a method for carrying out control of print-to-cut register of banknotes and like securities are for instance disclosed in International application Nos. WO 01/14111 and WO 2008/029340, both assigned to the present Applicant.

One may advantageously provide at least one optical system, upstream of the unloading station 30, for carrying out an optical quality control of the bundles 5 and/or read a marking provided on the bundles 5. In particular, optical character recognition of serial numbers printed on top of the uppermost security of each bundle 5 or of any distinctive marking printed or otherwise applied on the securities or on the securing band provided around each bundle 5 may be carried out. Such an optical system, or OCR unit, 85 is schematically illustrated in FIGS. 8 and 9. Thanks to such an OCR unit 85, one may provide for the automatic identification and eventual removal of a selected and determined number of bundles 5, for instance removal of a whole set 2 of bundles 5. Alternatively, an operator may arbitrarily select any bundle 5 for quality control purposes and remove such bundle 5 semi-automatically by activating the bundle removal device 32 when desired.

Preferably, the sample bundles that are removed from the flow of bundles 5 are placed by the bundle removal device 32 in at least one corresponding storage container, designated by reference numeral 31, where the sample bundles removed from the flow of bundles 5 are piled. One such storage container 31 is shown in FIGS. 3 and 4 on one side of the transporting path of the bundles 5, while FIGS. 8 and 9 show three additional storage containers 31 provided on the other side of the transporting path of the bundles 5. In this latter example, the bundle removal device 32 is advantageously designed to remove sample bundles in both directions transversely to the path of the bundles 5. Containers 31 are preferably interchangeable so that an operator may conveniently take one storage container 31 having sample bundles therein and replace it by an empty container 31.

Once a sample bundle is removed from the conveyor 20, an empty position is created in the flow of bundles 5. This empty slot needs to be filled in order to guarantee that the sequence of bundles 5 is not broken and to ensure that bundle stacks 75 of the appropriate size and with the desired bundles 5 are formed. A bundle loading station 40 is accordingly provided, downstream of the bundle unloading station 30, in order to introduce a corresponding number of replacement bundles in the empty slots in the flow of bundles 5. The bundle loading station 40 comprises at least one supply container 41 containing such replacement bundles which is placed directly above the path of the conveyor 20. One such supply container 41 is shown in FIGS. 3 and 4, while FIGS. 8 and 9 show three such supply containers 41, which containers 41 may advantageously be interchangeable. The replacement bundles may be any suitable bundles of securities and may be marked so as to be recognisable as replacement bundles. For example, they may have a particular sequence of serial numbers which is independent from the sequence of serial numbers which is currently being produced on the bundle processing system. In this context, so-called "star bundles" might be used as replacement bundles, which "star bundles" are bundles of securities wherein the sequence of serial numbers is supplemented with an additional symbol or figure, for example a star sign "*", so that the replacement bundles are readily recognizable from "traditional" bundles. Such is the practice for instance in Australia, India, New Zealand or the United States of America.

Downstream of the bundle loading station 40, one may advantageously provide a second optical system, designated by reference numeral 86, which can be identical to the first optical system or OCR unit 85 mentioned before. An additional OCR unit 86 downstream of the bundle loading station 40 would be useful to automatically record the serial numbers (or like marking) of the replacement bundles that were introduced at the bundle loading station 40.

In the example of FIGS. 3 to 9, conveying of the bundles 5 by the conveyor 20 ends downstream of the bundle loading station 40 (FIGS. 3 to 7), respectively downstream of the second optical system 86 (FIGS. 8 and 9). From this point, the bundles 5 are further conveyed by a conveyor arrangement 45 comprising pusher members that engage from above with the side of the bundles 5. This conveyor arrangement 45 is preferably operated in a stepwise manner (in contrast with the conveyor 20 that is operated continuously or semi-continuously) so that successive bundles 5 are brought to the downstream-located bundle stacking station 70 where successive bundle stacks 75 are formed.

The bundle stacking station 70 comprises in this example a turning table 71 visible in FIGS. 3 and 4 onto which bundles 5 are supplied one at a time. Above this turning table 71, there is provided an actuator 72 with moveable claw members that are adapted to move in a horizontal plane and designed to temporarily hold an incoming bundle 5 by its sides above the growing stack of bundles that is being formed on turning table 71. In this example, turning table is designed to rotate the growing stack of bundles 75 by 180 degrees before a subsequent bundle 5 is released by actuator 72 and is placed on top of the growing bundle stack 75. As a result, bundle stacks 75 with a succession of bundles 5 alternately rotated by 180 degrees are formed as schematically illustrated in FIG. 3. Once complete, the bundle stack 75 is moved to the side away from the turning table 72 by non-illustrated means to free the way for stacking of the subsequent bundles. As mentioned hereabove, this alternate stacking of bundles enables to somewhat compensate for the typical thickness variations of the securities due, for instance, to the varying reliefs created as a result of intaglio printing, the presence of security elements applied onto selected regions of the substrate (such as OVD's—Optically Variable Devices) or of security element embedded locally in the substrate (such as watermarks, security threads, windows, etc.).

Figure 10:
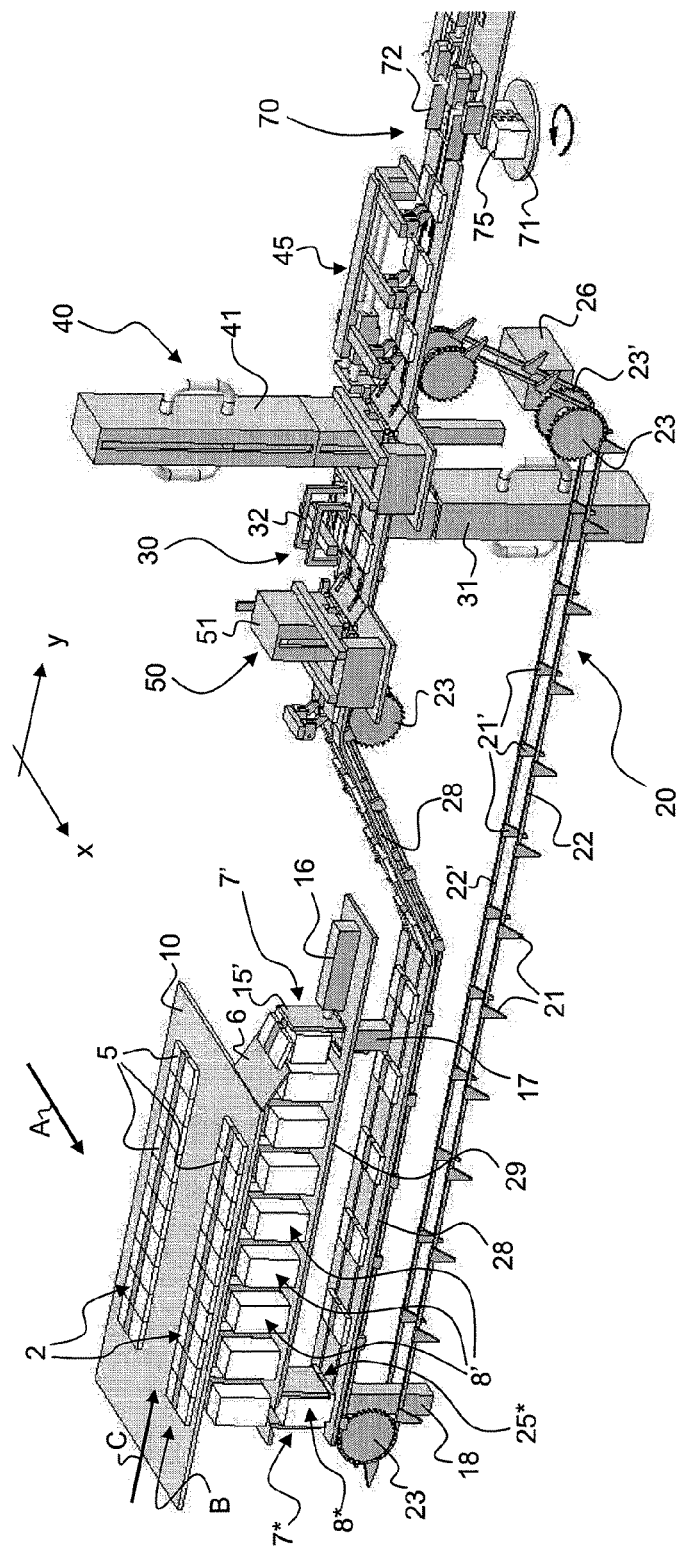
FIG. 10 is a schematic partial perspective view of a bundle processing system according to another embodiment of the invention.
Figure 11:
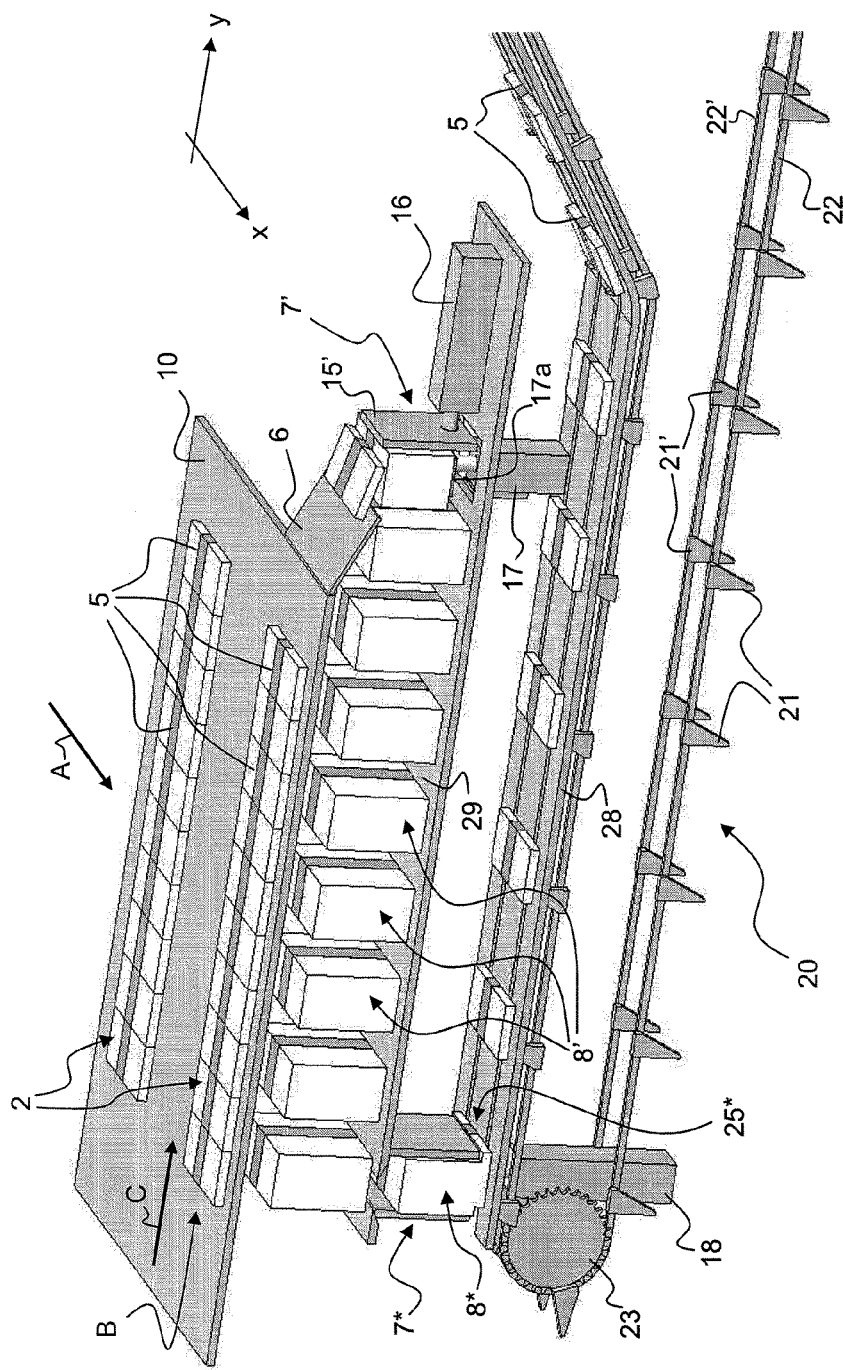
FIGS. 11 and 12 are enlarged partial perspective views from two different angles of the bundle processing system of FIG. 10 where consecutive bundles are piled one on top of the other to form a plurality of intermediate piles of bundles which are fed in sequence into an intermediate storage pocket, before being ejected one-by-one and conveyed from a bottom part of the intermediate storage pocket.
Figure 12:
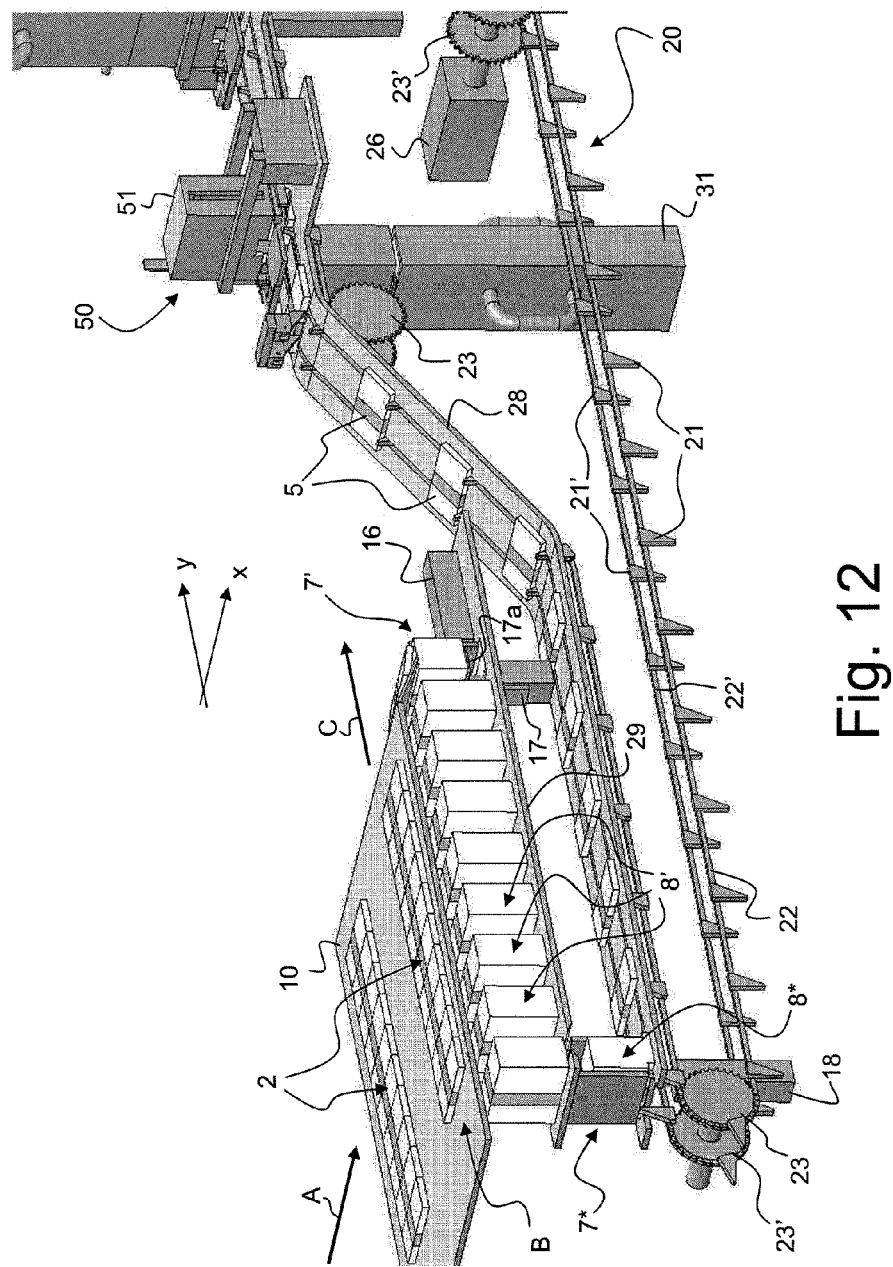

FIGS. 10 to 12 show a second embodiment of the present invention which is substantially similar to that of FIGS. 3 to 7. Like components are therefore designated by the same reference numerals and will not be described again.

In FIGS. 10 to 12, there is accordingly shown the platform 10 onto which successive sets 2 of bundles 5 are fed along the direction indicated by arrow A, which bundles 5 are fed to an intermediate storage compartment 7' comprising only one retainer structure 15' in this example, which retainer structure 15' further acts as a pusher. In contrast to the first embodiment, the intermediate storage compartment 7' is designed to enable formation of a plurality of intermediate piles 8' of bundles 5, which intermediate piles 8' are temporarily stored on a storage area 29 designed in this example as a shelf that is situated below the platform 10.

A first actuator 16 acting as a pile conveying means is provided to push the intermediate piles 8' on the storage area 29 via the retainer structure 15' along a direction opposition to axis y. Advantageously, a further actuator 17 is provided at the bottom of the intermediate storage compartment 7', which actuator 17 is used to selectively raise or lower a supporting plate 17a onto which the bundles 5 are piled. In this way, the depth of the intermediate storage compartment 7' can be adjusted while the bundles 5 are piled therein.

At the downstream end of the storage area 29, there is provided a further mechanism for feeding a first one 8\* of the plurality of intermediate piles 8' stored on storage area 29 into an intermediate storage pocket 7\* with rear and front retainer structures, not referenced. An additional actuator 18 acting from below is provided to ensure feeding of the intermediate pile 8\* into the intermediate storage pocket 7\*, i.e. by selectively lowering an intermediate pile 8' from storage area 29.

The front retainer structure of the intermediate storage pocket 7\* is designed in more or less the same way as the retainer structure 15 of the first embodiment, i.e. so as to leave a bundle-ejection opening 25\* between the lower end thereof and the surface of the supporting ramp 28 of the conveyor 20. According to this second embodiment, the conveyor 20 is located immediately below the intermediate storage pocket 7\* and operates in exactly the same way as explained in connection with the first embodiment, i.e. by ejecting a lowermost bundle from the bottom of the intermediate pile 8\* contained in the intermediate storage pocket 7\* under the action of the pusher members 21, 21' that are driven by the chains 22, 22' and gearwheels 23, 23'. The bundles 5 are then transported further by the conveyor 20 past the bundle unloading station 30 and the bundle loading station 40 to the bundle stacking station 70 as already explained.

The storage area 29 for the storage of intermediate piles 8' acts as an intermediate buffer having a larger buffer capacity as compared to that of the first embodiment of FIGS. 3 to 9. This increased buffer capacity is intended to provide time to an operator for selectively removing one or more sample bundles from the platform 10 and reintroduce these sample bundles in the flow of bundles 5 at a later stage as this will be explained.

According to the second embodiment illustrated in FIGS. 10 to 12, a sample bundle might be removed from the set 2 of bundles 5 on platform 10, either manually by an operator, or by means of an adequate extraction mechanism provided on platform 10. In the configuration illustrated in FIGS. 10 to 12, care should be taken that the sample bundle removed from platform 10 does not affect the processing thereof. It is therefore preferable to remove one or more sample bundles starting from the back end of a set 2 (i.e. from the left-hand side in FIGS. 10 to 12) so that it does not affect the order of the bundles in the resulting intermediate pile 8' formed in the intermediate storage compartment 7' (the remove sample bundle(s) would be located at the top of the intermediate pile 8'). In this way, one ensures that the resulting empty slots on the conveyor 20 will correspond to the correct locations of the sample bundles that were removed.

The sample bundles taken from platform 10 might be reintroduced in the flow of bundles 5 using a bundle inserting station 50 similar to the bundle loading station 40 mentioned previously. Such bundle inserting station 50 may for instance comprise at least one container 51 disposed above the path of the conveyor 20 where the sample bundles might be reintroduced. An OCR unit, not illustrated, placed upstream of the bundle inserting station 50 might be provided in order to ensure automatic insertion of the sample bundles back at the correct locations in the flow of bundles 5.

As mentioned above, the increased buffer capacity of this second embodiment would provide sufficient time to an operator to carry out a manual inspection of the sample bundle before this sample bundle needs to be introduced back in the flow of bundles 5.

Various modifications and/or improvements of the above-described embodiments might be carried out without departing from the scope of the appended claims. For instance, while the conveyor in the above embodiments advantageously fulfils both the function of ejector and of separator, one could provide for other solutions where ejection of the bundles from the bottom of the intermediate pile is carried out by a first device, e.g. by means of a specific ejection mechanism, before being actually transferred onto a conveyor with space-apart pusher members, which conveyor would merely fulfil the function of separator in this case. The above-described solution is however preferred as it is more simple to implement.

In addition, the intermediate storage compartment 7 of the first embodiment illustrated in FIGS. 3 to 9 might be modified so as to provide a movable supporting plate and actuator similar to the ones (i.e. elements 17 and 17a) used in the context of the second embodiment of FIGS. 10 to 12 to adjust the depth of the intermediate storage compartment 7'.

It shall furthermore be appreciated that FIG. 1 only shows a preferred sheet stack processing system for processing sheet stacks into successive sets of consecutive bundles of securities arranged side-by-side. Any other stack processing system might be envisaged, provided it can deliver at its output successive sets of consecutive bundles of securities arranged side-by-side. In particular, the sheet stack processing system might be adapted to output successive sets of consecutive bundles arranged side-by-side which correspond to a complete row of securities processed from the stack of sheets, rather than to a complete column of securities as illustrated in FIG. 1. Further, the banding station BS in FIG. 1 is not necessary and might for instance be replaced by a stapling station for providing multiple staples through the bundle strips S.

The invention claimed is:

1. A bundle processing system for processing bundles of securities, the system comprising:
   a sheet stack processing system for processing stacks of sheets, each carrying an array of multiple security prints arranged in a matrix of rows and columns, into successive sets of consecutive bundles of securities arranged side-by-side;
   pile forming means for placing consecutive bundles of a set one on top of the other and thereby form at least one intermediate pile of consecutive bundles;
   an ejector for successively ejecting said bundles one-by-one from a bottom of said at least one intermediate pile;
   a conveyor for conveying each ejected bundle with a determined spacing from a preceding and/or following ejected bundle; and
   bundle replacing means for automatically removing at least one sample bundle from the flow of bundles and replacing said at least one sample bundle by a replacement bundle;
   wherein said bundle replacing means include:
   a bundle unloading station placed along said conveyor for selectively removing said at least one sample bundle from the flow of bundles; and
   a bundle loading station placed along said conveyor downstream of the bundle unloading station for selectively introducing at least one replacement bundle into said flow of bundles.

2. The system according to claim 1, wherein said pile forming means include an inclined ramp leading down to an intermediate storage compartment where said consecutive bundles of a set are guided.

3. The system according to claim 2, wherein an inclination angle of said inclined ramp is adjustable.

4. The system according to claim 1, wherein said conveyor runs below said at least one intermediate pile and comprises a plurality of pusher members acting as said ejector, which pusher members are spaced apart from one another by said determined spacing, each pusher member being adapted to eject and convey one bundle from the bottom of said intermediate pile.

5. The system according to claim 1, wherein said pile forming means include an intermediate storage compartment where said consecutive bundles of a set are guided to form said intermediate pile and wherein said conveyor runs at a bottom part of said intermediate storage compartment and comprises a plurality of pusher members acting as said ejector, which pusher members are spaced apart from one another by said determined spacing, each pusher member being adapted to eject and convey one bundle from the bottom of said intermediate pile through a lateral opening provided at the bottom of said intermediate storage compartment.

6. The system according to claim 1, further comprising:
   an intermediate storage area for storing a plurality of intermediate piles of consecutive bundles before ejection and conveyance thereof; and
   pile conveying means for feeding each intermediate pile in succession from said intermediate storage area into an intermediate storage pocket adapted to receive a first one of said intermediate piles,
   wherein said conveyor runs at a bottom part of said intermediate storage pocket and comprises a plurality of pusher members acting as said ejector, which pusher members are spaced apart from one another by said determined spacing, each pusher member being adapted to eject and convey one bundle from the bottom of said intermediate pile contained in said intermediate storage pocket through a lateral opening provided at the bottom of said intermediate storage pocket.

7. The system according to claim 1, further comprising a bundle insertion station for automatically reintroducing at least one sample bundle that was previously removed into the flow of bundles conveyed by the conveyor.

8. The system according to claim 1, further comprising at least one OCR unit for automatic reading of a marking, such as a serial number, provided on said bundles.

9. The system according to claim 1, wherein said bundle unloading station is equipped with at least one interchangeable storage container for receiving the sample bundles removed from the flow of bundles.

10. The system according to claim 1, wherein said bundle loading station is equipped with at least one interchangeable supply container containing replacement bundles for introduction into the flow of bundles.

* * * * *